S. NAYLOR & A. FAIRCHILD.
Lamp-Wick Trimmers.

No. 142,265.	Patented August 26, 1873.

Witnesses
John A. Ellis
E. E. Ellis

Inventor
Samuel Naylor & Asahel Fairchild
Per
T. H. Alexander & Co.
Att'ys

UNITED STATES PATENT OFFICE.

SAMUEL NAYLOR AND ASAHEL FAIRCHILD, OF INDEPENDENCE, IOWA.

IMPROVEMENT IN LAMP-WICK TRIMMERS.

Specification forming part of Letters Patent No. 142,265, dated August 26, 1873; application filed July 15, 1873.

*To all whom it may concern:*

Be it known that we, S. NAYLOR and A. FAIRCHILD, of Independence, in the county of Buchanan and State of Iowa, have invented certain new and useful Improvements in Wick-Trimmer; and we do hereby declare that the following is a full, clear, and exact description thereof, reference being had to the accompanying drawings, and to the letters of reference marked thereon, which form a part of this specification.

The nature of our invention consists in so constructing the forward end of the lower handle of a lamp-wick trimmer that the upper handle may be pivoted in the rear of the cutting-edge of the knife, thus giving a view of the wick while the same is being trimmed, as will be hereinafter more fully set forth.

In order to enable others skilled in the art to which our invention appertains to make and use the same, we will now proceed to describe its construction and operation, referring to the annexed drawing, in which—

Figure 1:
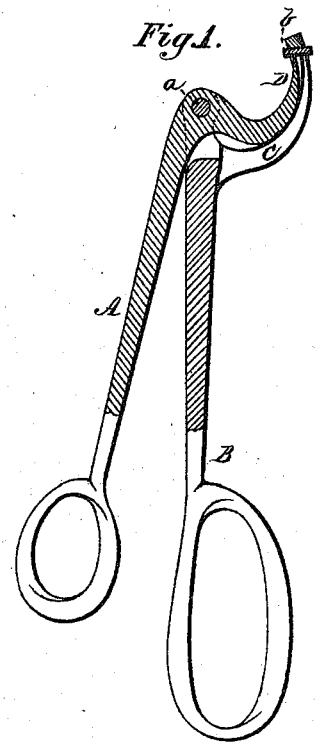
Figure 2:
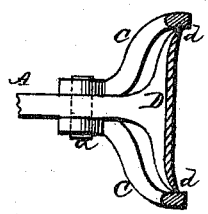

Figure 1 is a longitudinal section of our lamp-wick trimmer, and Fig. 2 is a cross-section of the same through the knife.

A represents the upper, and B the lower, handle of our lamp-wick trimmer. The front end of the lower handle B is forked, and the upper handle A is pivoted in the same, as seen at $a$. From the lower handle B, a short distance in rear of the pivot-point $a$, projects a frame, C, which extends downward and forward, and is in its front end provided with a straight bar, $b$, of brass or other suitable soft metal, against which the knife-edge will work. The bar $b$, being of some metal softer than iron, will not dull the knife as much as would otherwise be the case. The upper handle A, from the pivot-point $a$, is bent downward and forward, and has the knife or blade D formed upon its front end. The corners of the knife D are curved downward, as shown at $d\ d$, the whole knife-edge being slightly curved, and the corners curved more abruptly. This shape of the knife leaves the lamp-wick trimmed at one operation in the proper shape, and, the cutting-parts being located in front of the pivot-point, the operator can readily see the wick, so as to place the instrument properly for trimming.

Having thus fully described our invention, what we claim as new, and desire to secure by Letters Patent, is—

The upper handle A, formed with a broad cutting-edge, D, in combination with the lower handle B, formed with the frame C, and the two parts pivoted at the rear of the cutting-edge, thus exposing to view the wick as the same is being trimmed, as herein set forth.

In testimony that we claim the foregoing as our own we affix our signatures in presence of two witnesses.

SAMUEL NAYLOR.
    ASAHEL FAIRCHILD.

Witnesses:
 J. S. WOODWARD,
 C. A. WATTLES.